US006543624B1

United States Patent
Geisbauer

(10) Patent No.: US 6,543,624 B1
(45) Date of Patent: Apr. 8, 2003

(54) BACK-WASHABLE FILTER FOR LIQUIDS

(75) Inventor: Heinz Geisbauer, Pfedelbach (DE)

(73) Assignee: Mahle Filtersysteme GmbH, Stuttgart (DE)

(*) Notice: Subject to any disclaimer, the term of this patent is extended or adjusted under 35 U.S.C. 154(b) by 0 days.

(21) Appl. No.: 09/958,895

(22) PCT Filed: Jan. 27, 2000

(86) PCT No.: PCT/DE00/00257

§ 371 (c)(1),
(2), (4) Date: Oct. 15, 2001

(87) PCT Pub. No.: WO00/62892

PCT Pub. Date: Oct. 26, 2000

(30) Foreign Application Priority Data

Apr. 16, 1999 (DE) .......................... 199 17 259

(51) Int. Cl.⁷ .................. B01D 33/50; B01D 33/073; B01D 29/68
(52) U.S. Cl. .................. 210/411; 210/412; 210/393; 210/398; 210/333.1
(58) Field of Search ................ 210/409, 411, 210/412, 393, 333.1, 398

(56) References Cited

U.S. PATENT DOCUMENTS

| 2,167,322 A | * | 7/1939 | Cuno et al. |
| 2,918,172 A | * | 12/1959 | Kinney |
| 3,074,560 A | * | 1/1963 | Kinney |
| 3,784,017 A | * | 1/1974 | Arnold et al. |

FOREIGN PATENT DOCUMENTS

| DE | 34 30 523 | 2/1986 |
| DE | 91 03 149 | 7/1992 |
| DE | 41 25 358 | 2/1993 |
| DE | 195 23 462 | 1/1997 |
| DE | 198 03 083 | 7/1999 |

* cited by examiner

Primary Examiner—Thomas M. Lithgow
(74) Attorney, Agent, or Firm—Collard & Roe, P.C.

(57) ABSTRACT

The aim of the invention is to improve the backwashing action of a backwashable filter for liquids comprising the following: a filter body which is located in a housing and which separates an incoming flow chamber from an outgoing flow chamber and a backwashing channel which lies adjacent to the filter body, is situated in the outgoing flow chamber and has a backwashing opening that faces towards the filter body, said backwashing channel also communicating with a source of a cleaning medium and said cleaning medium being subjected to pressure in the backwashing channel, and the filter body and the backwashing channel being moveable in relation to each other. To this end, the filter body has links on a side facing towards the backwashing channel which are set apart from each other in the direction of motion. Adjacent links form a separately backwashable segment respectively and when a segment is backwashed, the corresponding links lie sealingly against the backwashing channel with sealing surfaces and expose the backwashing opening. Each sealing surface extends further than the backwashing opening in the direction of motion, so that each link can tightly seal the backwashing opening with its sealing surface.

11 Claims, 3 Drawing Sheets

BACK-WASHABLE FILTER FOR LIQUIDS

CROSS REFERENCE TO RELATED APPLICATIONS

Figure 1:
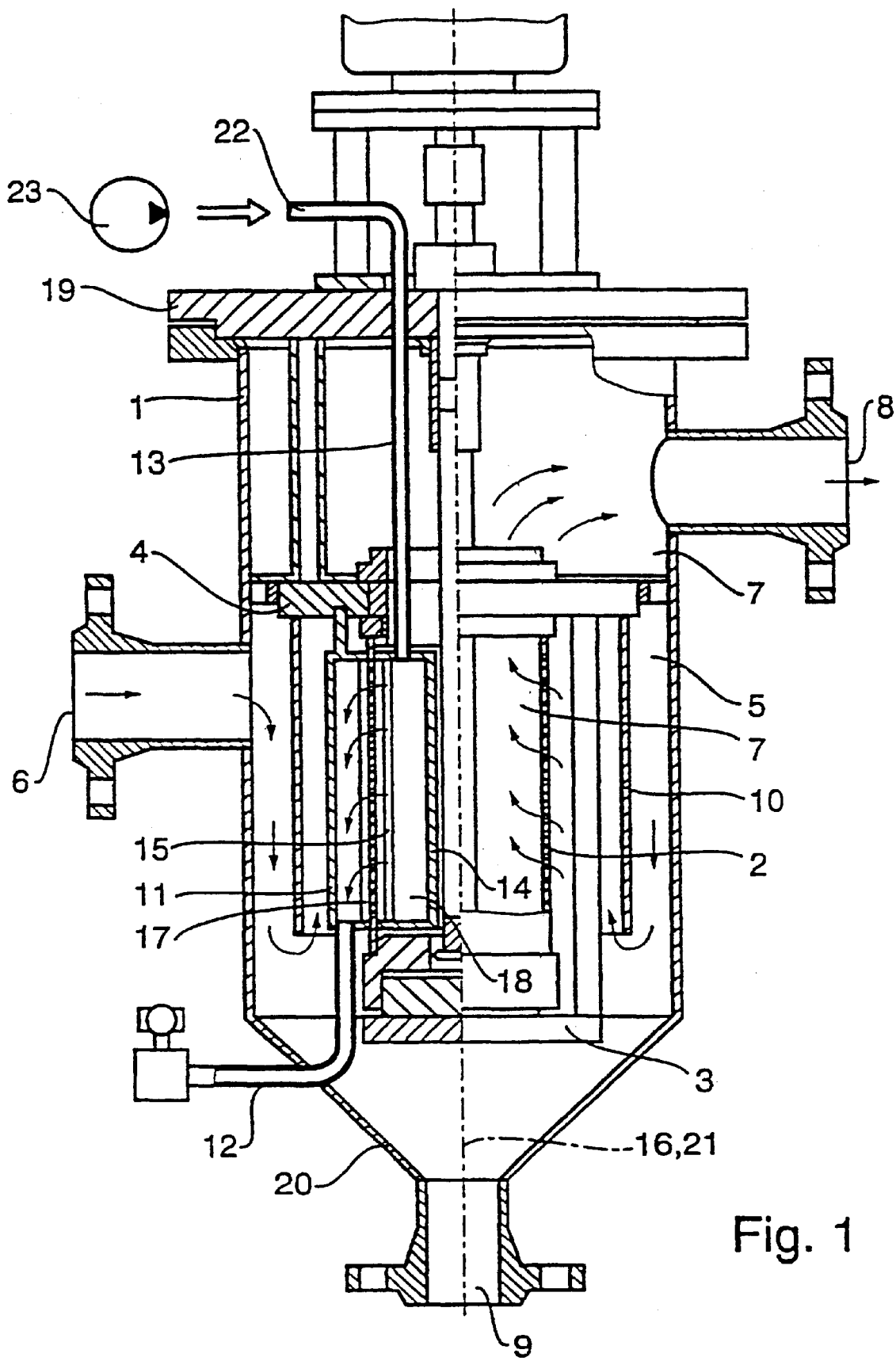

Applicant claims priority under 35 U.S.C. §119 of German Application No. 199 17 259.5 filed Apr. 16, 1999. Applicant also claims priority under 35 U.S.C. §120 of PCT/DE00/00257 filed Jan. 27, 2000. The international application under PCT article 21(2) was not published in English.

The invention concerns a back-washable filter for liquids containing impurities.

A filter of this type having the features A to F of claim 11 is known from DE 91 03 149 U1, in which a circularly cylindrical filter body is located in a circularly cylindrical filter housing, with the filter body separating a inner radial incoming flow chamber on the unfiltered side from an outer radial outgoing flow chamber on the filtered side. An axially extending washing channel is located in the outgoing flow chamber which presses radially outward against the filter body. The washing channel has an axially extending washing gap which faces the filter body. In addition, the washing channel communicates with a cleaning liquid source. The cleaning liquid can be pressurized in the washing channel to achieve efficient cleaning and/or backwashing of the filter body. The filter body and the washing channel can be moved relative to one another in one movement direction. In this way, the entire lateral surface of the filter body can be completely backwashed in the course of a complete rotation of the filter body.

A filter of this type is also known from DE 198 03 083, which is older, but was published later, which also has the features G to J of claim 11 and in which the filter body has links on a side facing the washing channel which are positioned at intervals in the movement direction. Each two neighboring links form a separately back-washable segment on the filter body, with the two associated links pressing tightly against the washing channel before and after the washing opening relative to the movement direction and exposing the washing opening during washing of one of these segments. The extension of each sealing surface is greater than the extension of the washing opening relative to the movement direction.

In filters of this type, the backwashing of the filter body is performed by pressurizing the cleaning liquid in the washing channel, causing the cleaning liquid to penetrate the filter body via the washing gap and remove the dirt on the incoming flow side. The quality of the cleaning effect in these types of filters essentially depends on the liquid volume flow effecting the backwashing. In the known filter, the cleaning liquid in the washing channel is fed to the filter body at an essentially constant pressure, so that the cleaning process can be performed with a correspondingly constant cleaning fluid volume flow. In order for this to be able to be performed continuously along the entire circumference of the filter body, the flow rate of the cleaning agent source, e.g. a pump, must be at least large enough that cleaning liquid can refill the washing channel under pressure with the same volume flow.

A back-washable filter of another type is known from DE 195 23 462 A1 which has a vertically positioned, circularly cylindrical filter housing in which a circularly cylindrical filter body is located which axially separates an incoming flow chamber on the unfiltered side from an outgoing flow chamber on the filtered side. In this filter, a backflow channel is located in the incoming flow chamber and presses against the filter body. This backflow channel has a inlet gap which faces the filter body. The backflow channel communicates with a relatively pressureless outlet, so that backwashing can also be performed in this case. To improve the cleaning effect, the filter body is divided into segments which can have separate flows through them, i.e. can be separately backwashed, and whose curve lengths are at most as long as the curve length of the backflow channel which presses against the outer surface of the filter body. In this case, the filter body is divided into segments by links successively positioned at intervals around the circumference. During washing of the segment, the two associated links press tightly against the backflow channel before and after the supply gap relative to the movement direction, i.e. in the circumferential direction, so that the entire cleaning effect of the backflow channel is limited to the currently activated segment.

The pressure of the cleaning liquid, specifically the filtered side pressure in the outgoing flow chamber during the backwashing process, also remains essentially constant in this filter type, so that a uniform cleaning fluid volume flow can be ensured in this case as well. In order to prevent pressure drop, the volume flow delivered by the cleaning liquid source must be larger than or at least as large as the cleaning liquid volume flow during the backwashing in this case as well. This is provided in this case in that a portion of the filtered liquid is used as the cleaning medium, which is discharged directly from the outgoing flow chamber through the filter body and the backflow channel again. The pump which serves for flow through the filter typically has a pump rate which is many times greater than the backwash volume flow, so that the filter housing cannot be emptied during the backwashing.

The present invention concerns itself with the problem of improving the backwashing effect in a filter of the type initially cited.

This problem is solved by a filter with the features of claim 11.

The invention is based on the general idea of cleaning the individual segments of a segmented filter body one at a time with the aid of a washing procedure acting in a blast-like or pulse-like way, which is achieved with the aid of a cleaning medium store located between the cleaning medium source and the washing opening.

The development of this type of pulse or blast, formed from a relatively large volume flow of cleaning medium at relatively high pressure for backwashing individual segments, is achieved in the filter according to the invention in that the links for separating the segments close the washing opening of the washing channel between two washing procedures. As long as the washing opening is closed, the cleaning medium source can introduce more cleaning medium into the washing channel than exits the channel through the washing opening, so that the possibility exists of producing a pressure increase in the cleaning medium in the washing channel. This increased pressure then causes a washing pulse with increased pressure and elevated volume flow when the washing opening is opened, which significantly improves the cleaning effect.

During the phases in which the links close the washing opening, the cleaning medium store can be filled and pressure can be built up in the cleaning medium in the washing channel and/or in the upstream cleaning medium store. Particularly when the washing channel communicates relatively unrestrictedly with a cleaning medium store, a cleaning medium volume flow can be released for washing when the washing opening is opened which is significantly greater than the delivery flow of the cleaning medium used. Then with, for example, the washing opening being closed at least as long as it is open, a volume can be released during washing which is at least twice as large as the volume fed from the source to the washing channel for filling the store during this time, if the cleaning medium store is permanently fed by the cleaning medium source.

In a special embodiment, the links close the washing opening at least exactly as long as they are opened for cleaning a segment, which allows a particularly high pressure drop and/or volume flow to be achieved.

According to an advantageous embodiment, the washing channel can communicate relatively unrestrictedly with a cleaning medium store, which is downstream from and can be filled by the cleaning medium source, with the cleaning medium able to be pressurized in the cleaning medium store. In an embodiment of this type, the advantages according to the invention are particularly clear, because during the phases in which the links close the washing opening, the cleaning medium store can be filled and pressure in the cleaning medium can be built up in the washing channel and/or in the upstream cleaning medium store. When the washing opening is opened, a cleaning medium volume flow can then be released for washing which is significantly larger than the delivery flow of the cleaning medium source used. Then, for example, with the washing opening being closed at least as long as it is opened, a volume can be released during washing which is at least twice as large as the volume supplied from the source to the washing channel for filling the store during this time, if the cleaning medium store is permanently fed by the cleaning medium source.

This relationship is used in a further development of the filter in that the volume of the cleaning medium store, the washing pressure, and the washing opening are dimensioned in such a way that, during washing of the segment, the cleaning medium volume flow during the entire cleaning procedure is always larger than the filling volume flow of the cleaning medium source. The filter according to the invention differs significantly from typical filters in the clearing effect which can be achieved in this way. In particular, the filter according to the invention does not require a mechanical scraper or stripper to act on the filter body in the incoming flow chamber, which typical filters need for pre-cleaning so that the washing procedure can achieve the desired cleaning effect.

According to a particularly advantageous embodiment, he cleaning medium store can be implemented in the washing channel. For the case in which the filter body is implemented as cylindrical and the flow passes through it from radially outward to radially inward, the washing channel with integrated cleaning medium store is therefore located inside the filter body, so that the assembly dimensions of the filter housing, which is located radially outside, are not changed by these measures. This design is particularly suitable for the usage of a gaseous fluid as the cleaning medium, because it can be particularly easily stored through compression.

A liquid fluid can also be used as the cleaning medium, with an appropriately implemented cleaning medium store then being provided, containing, for example, a gas cushion or a spring-loaded, movable piston for generating a static pretension in the cleaning medium.

In order to implement the closed times of the washing opening as greater than the open times and/or washing times, there is the possibility of implementing the extension of the sealing surfaces of each link in the movement direction as greater than the interval between the sealing surfaces of neighboring links. It has been shown to be particular advantageous to implement the extension of the sealing surfaces as approximately five times larger than the interval between neighboring sealing surfaces.

It is also possible to implement a drive for realizing the relative motion between the filter body and the washing channel in such a way that the relative motion runs more slowly when the sealing surface of a link closes the washing opening and runs more quickly when the washing opening is between the sealing surfaces of neighboring links. It is also possible to use a stepping motor for the drive which, for example, is operated in such a way that it stands longer in a closed position of the washing opening than in an opened position.

Further important features and advantages of the filter according to the invention arise from the sub-claims, the drawings, and the associated description of the figures with reference to the drawings.

It should be noted that the previously described features and the features described in the following are usable not only in the respective combinations indicated, but also in other combinations or alone, without leaving the framework of the present inventon.

Preferred embodiments of the invention are illustrated in the drawings and are described in more detail in the following description.

Figure 2:
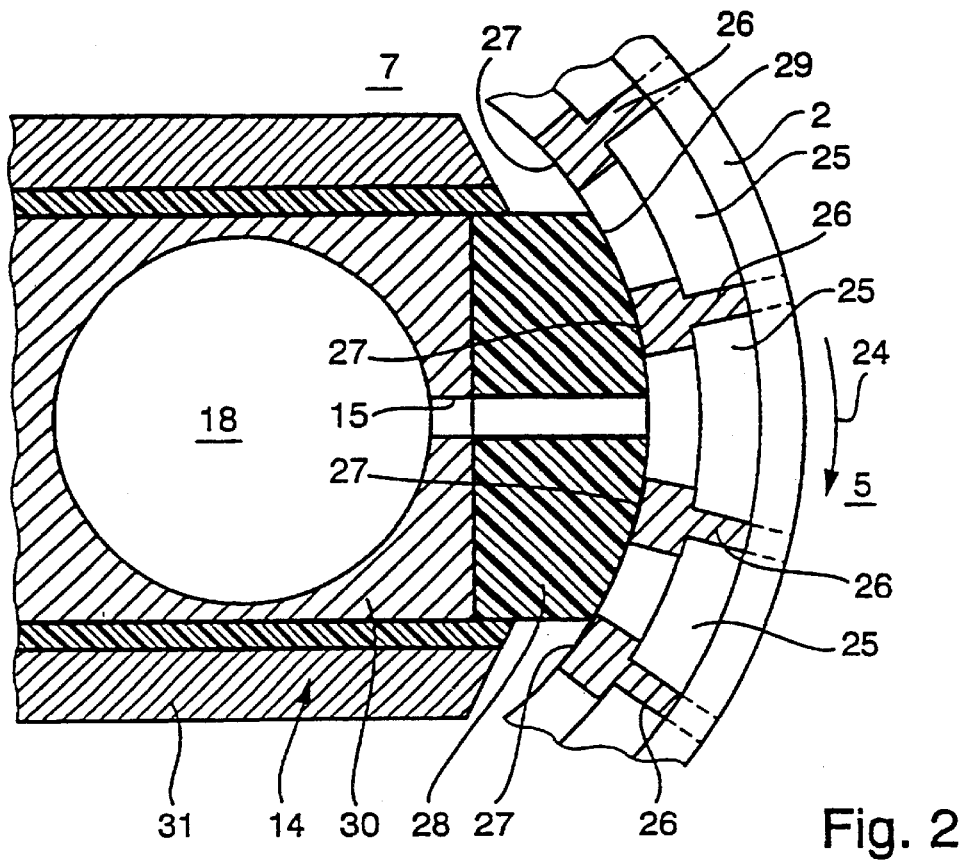
Figure 3:
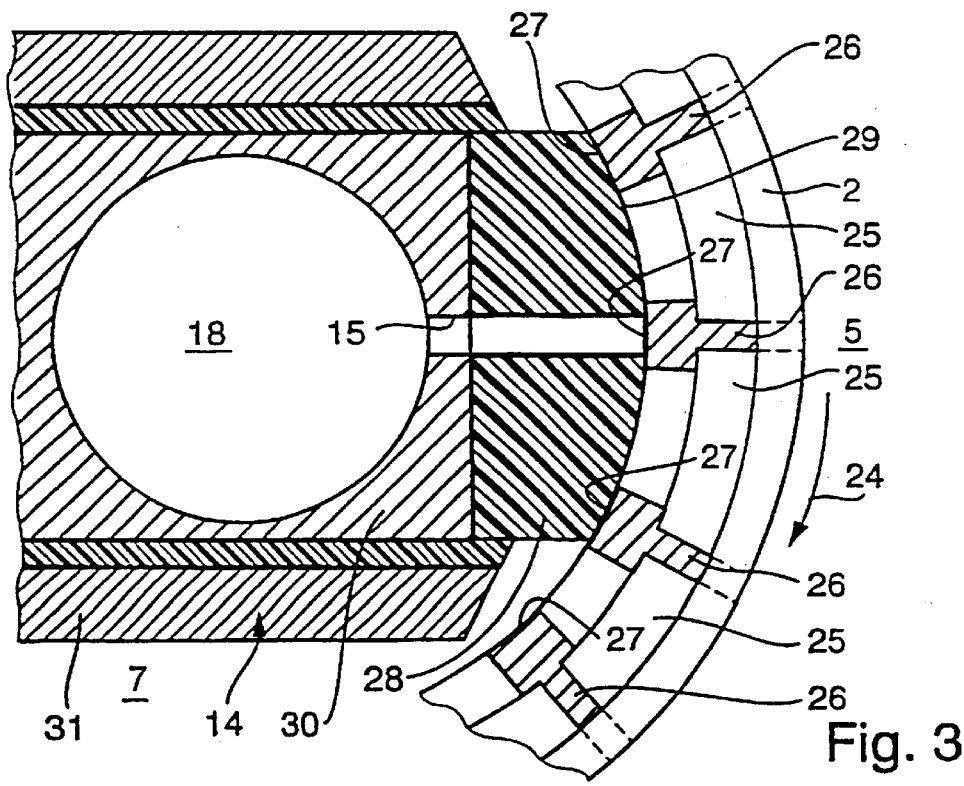
Figure 4:
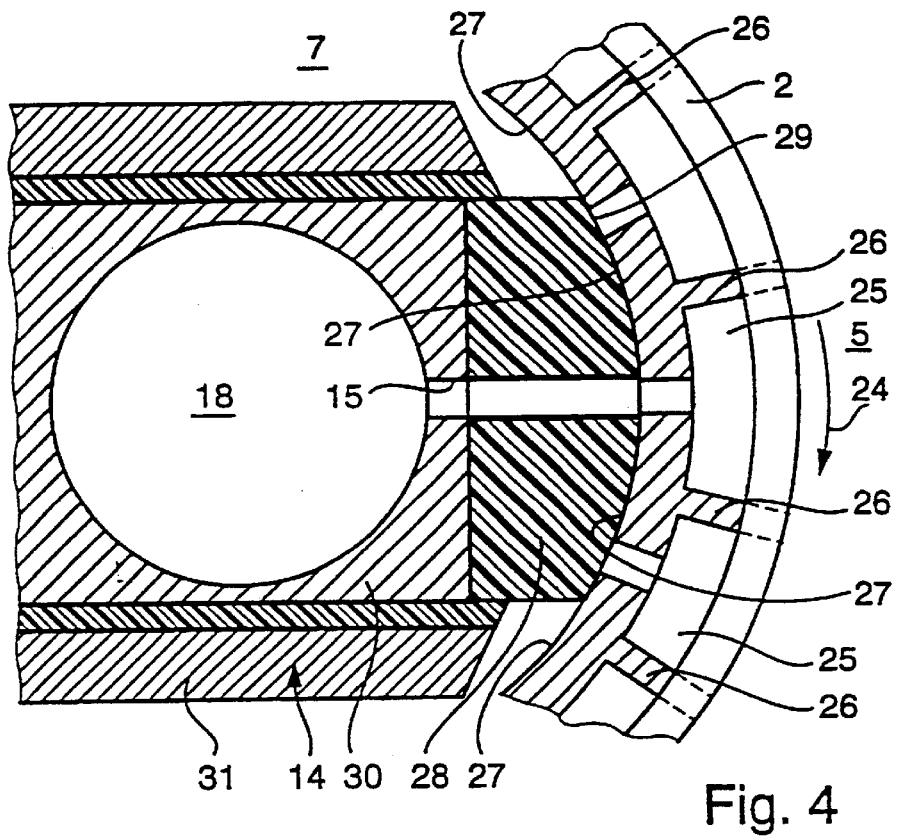
Figure 5:
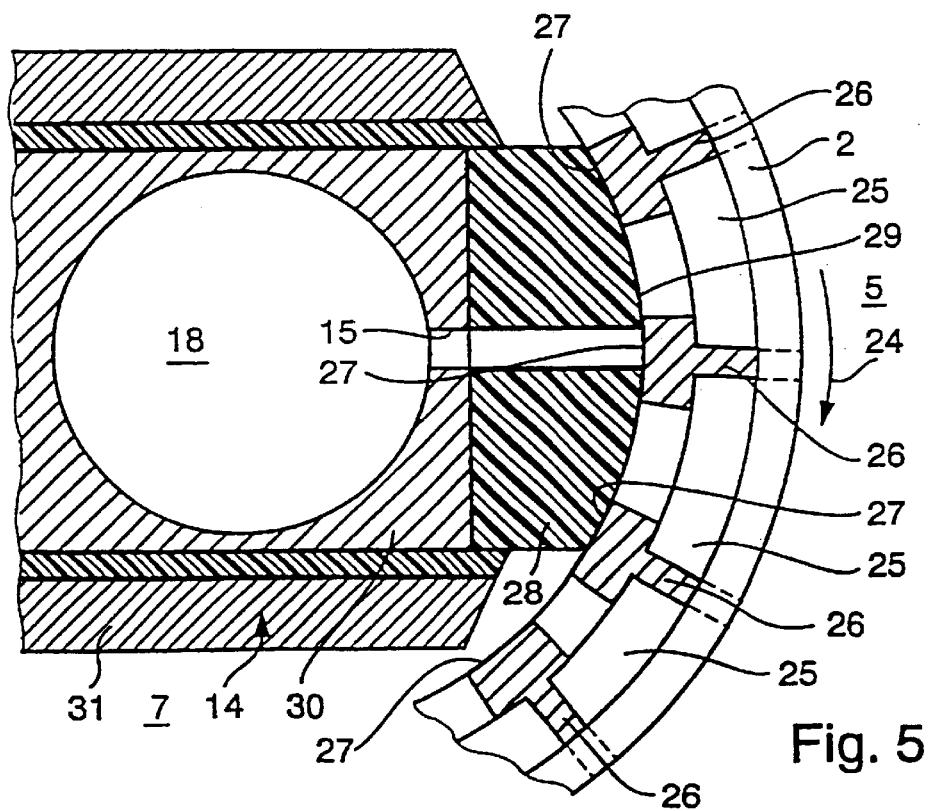

FIG. 1 schematically shows a longitudinal section through a back-washable filter according to the invention, FIG. 2 schematically shows a cross-section through a part of a washing channel and a part of a region of the filter containing a filter body in a first embodiment with the washing opening opened, FIG. 3 schematically shows a cross-section as in FIG. 2, but with the washing opening closed, FIG. 4 schematically shows a cross-section as in FIG. 2, but of another embodiment, and FIG. 5 schematically shows a cross-section as in FIG. 3, but of a further embodiment.

According to FIG. 1, a circularly cylindrical filter body 2, which in this case is implemented as an edge slot filter body, is coaxially located in a vertical circularly cylindrical filter housing 1. The filter body 2 is axially provided with a lower covering 3 and an upper covering 4, which separate an outer radial ring-shaped incoming flow chamber 5, having a supply inlet 6 located in the filter housing 1, from an internal radial outgoing flow chamber 7 inside the filter body 2. The outgoing flow chamber 7 comprises, in addition to the inside of the filter body 2, an loser section above the upper covering 4 which has a drainage outlet 8 and communicates via penetrations in the upper covering 4 with the inside of the filter body 2. An submerged tube 10 is positioned coaxially to the filter body 2 in the incoming flow chamber 5.

The liquid to be filtered flows, via the supply inlet 6, tangentially into the filter housing 1 and discharges into the supply space 5, which results in a cyclone effect, through which coarse impurities in the liquid are separated and deposited in a lower, conically tapering section or floor 20 of the filter housing 1, in which an outlet 9 for removal of the impurities is provided. The liquid then flows around the lower axial face of the submerged tube 10 and is diverted into the inner region of the incoming flow chamber 5 therein, which is radially delimited by the submerged tube 10 and the outer mantle of the filter body 2. The liquid flows through the filter body radially from the outside to the inside, which cleans the impurities from the liquid; the cleaned liquid is then carried out of the filter from the outgoing flow chamber 7 through the drainage outlet 8.

To clean off the dirt particles deposited on the outer mantle of the filter body 2, a washing channel 14 is positioned inside the filter body 2 which directly borders on the inner mantle of the filter body 2 and extends axially approximately along the height of the filter body 2. The washing channel 14 has a washing opening 15, implemented as an axially extending gap on its side facing the inner mantle of the filter body 2, which is implemented over the length of the washing channel 14. In place of one single washing gap, multiple axially separated washing openings could also be provided. The washing channel 14 is connected with a pressure line 13, which leads through a cover 19 of the filter housing 1 and can have a pressurized cleaning medium applied to it, particularly compressed air or cleaned liquid, via a pressure connection 22.

The pressurized cleaning medium flows from the washing channel 14, via the cleaning opening 15, radially from the inside to the outside through the wall of the filter body 2, thus detaching the deposits on the outer mantle of the filter body 2.

The rotationally symmetric filter body 2 is mounted so it is rotatable around its longitudinal axis 16, which is identical with the vertical axis 21 of the filter housing 1; the washing channel 14 is, in contrast, kept stationary inside the filter body 2. During a rotation of the filter body 2, all sections of the inner mantle come into contact with the washing opening 15 of the washing channel 14, so that the entire circumference of the outer mantle of the filter body 2 is cleaned.

The filter body 2 can be rotated continuously for a permanently running cleaning or can be rotated intermittently for a cleaning to be performed as necessary; the application of pressurized cleaning medium can also occur continuously or intermittently. It is also possible to continue the filtering procedure during the cleaning and/or the backwashing procedure.

A portion of the impurities detached during backwashing sink down into the conical section 20 of the filter housing and can be removed via the outlet 9. In order to, in addition, remove dirt particles from the incoming flow chamber 5 immediately after they are detached, a backflow channel 11 is provided in the special embodiment illustrated here which is fixed directly on the outer mantle of the filter body 2 parallel to the washing channel 14 in the incoming flow chamber 5. The backflow channel 11 has an inlet gap 17 facing the outer mantle of the filter body 2 which extends over the length of the backflow channel 11 and lies radially in alignment with the washing opening 15 of the washing channel 14. The particles detached by the cleaning medium from the outer mantle of the filter body 2 under pressure are guided via the inlet gap 17 into the backflow channel 11.

The lower section of the backflow channel 11 discharges into a drainage pipe 12 leading laterally out of the housing 1, via which the impurities collected in the backflow channel 11 can be removed.

Both the washing channel 14 and the backflow channel 11 have an approximately rectangular external cross-section in this case, with the side of each channel 11, 14 facing the filter body 2 being curved corresponding to the radius of the filter body 2 in order to obtain a tight seal between the channel and the filter body and prevent leakages between the inside of the washing channel 14 and the outgoing flow chamber 7.

In other embodiments, not shown, multiple filter bodies 2 can be grouped in the filter housing 1 at equal radial distances around the vertical axis 21 of the filter housing 1, which significantly increases the flow rate. A washing channel 14 is then located in each of these filter bodies 2 which is supplied with cleaning medium via a pressure line 13 and a pressure connection 22. An embodiment is also possible in which the filter body 2 is fixed, while the washing channel 14 rotates around a rotational axis and is guided along the inner mantle of the filter body 2.

The inside of the washing channel 14 is implemented as a cleaning medium store 18 which is connected via the pressure line 13 to a cleaning medium source, symbolically depicted here as the pump 23. When, for example, compressed air is used as the cleaning medium, the pump 23 can introduce the compressed air into the cleaning medium store 18 and, if less compressed air exits through the cleaning opening 15 than is supplied by the pump 23, cause compression of the air in the store 18 and thus an increase in pressure in he cleaning medium.

As can be seen from FIGS. 2 to 5, the filter body 2 is divided in the peripheral direction, i.e. in the direction of movement of the relative motion occurring between the filter body 2 and the washing channel 14 indicated with an arrow 24, into successive, separately back-washable segments 25. Each of these segments 25 is delimited in the direction of movement 24 by two links 26, which extend radially in this case, so that each two neighboring links 26 form a segment 25 on the filter body 2. The inner mantle or the inner surface of the filter body 2 is formed in this case by the free ends of the links 26, which project radially inward, each of which are equipped on their side facing the outgoing flow chamber 7 with a sealing surface 27.

The washing channel 14 has a sealing body 28 on its side facing the filter body 2, with which the washing channel 14 presses against the filter body 2 and therefore against the sealing surfaces 27 of the links 26. Because the filter body 2 is implemented as curved, particularly as circularly cylindrical, the sealing surfaces 27 and an outer surface 29 of the sealing body 28 which works together with them are implemented as curved in the same way, which allows the sealing surfaces 27 to press flat against the outer surface 27 and to produce an effective seal. In order to improve the sealing effect, an inner part 30 of the washing channel 14, which supports the sealing body 28 and contains the cleaning medium store 18 and the washing opening 15, is mounted in an outer part 31 of the washing channel 14 so it can be radially adjusted and pretensioned with corresponding spring elements, not shown, against the filter body 2.

According to FIGS. 2 and 3, in a first embodiment, the sealing surfaces 27 of the links 26 are dimensioned in such a way that they extend in the direction of movement 24 far enough to completely cover, and thus tightly close, the washing opening 15. This closed position is illustrated in FIG. 3. In FIG. 2 the washing opening 15 is between two neighboring links 26 relative to the direction of movement 24, with the exit of cleaning medium from the cleaning opening 15 being laterally delimited to the segment 25 formed by the links 26 neighboring the washing opening 15 by the sealing effect of the sealing surfaces 27. As a consequence, in the position shown in FIG. 2, only the segment 25 communicating with the washing opening 15 is backwashed.

In the embodiment illustrated in FIGS. 2 and 3, the filter operates as follows:

The filter has a stepping motor which adjusts the filter body 2 by one segment 25 for each step. At the same time, the filter body 2 has the relative position to the washing channel 14 shown in FIG. 3 after each step, i.e. a link 26 closes the washing opening 15 with its sealing surface 27. Between two successive adjustment motions of the filter body 2, the cleaning medium store 18 can be refilled with cleaning medium through the communicating connection of the cleaning medium store 18 with the cleaning medium source 23 (cf. FIG. 1), with a relatively high washing pressure able to be built up in the cleaning medium store 18. During each step adjustment of the filter body 2 by one segment 25, the washing opening 15 is completely opened and backwashing of the current segment 25 occurs. The cleaning medium can thus exit the cleaning medium store 18 at a high pressure and thus effect a pulse-like application of cleaning medium onto the current segment 25. This type of cleaning procedure occurring in blasts is highly effective. The open time or washing time, i.e. the time during which the washing opening 15 is open—as in FIG. 2, for example—can be approximately as great as the closed time in this special embodiment, but is preferably significantly less than the closed time, i.e. the time during which the washing opening 15 is tightly sealed by the sealing surface 27 of one of the links 26—as in, for example, FIG. 3.

If the washing time selected is equally to or greater than the opening time, with suitable selection of the cleaning medium source 23, the volume flow which exits from the washing opening 15 for cleaning the current segment 25 during one washing procedure can be significantly larger than the volume flow which refills the cleaning medium store 18 from the cleaning medium source 23. Correspondingly, the cleaning effect in the filter according to the invention is increased relative to filters in which the washing volume flow during backwashing essentially corresponds to the filling volume flow of the cleaning medium source.

In another embodiment, the drive of the filter body 2 can also be clocked so that it has a stop period, in the relative position between the filter body 2 and washing chamber 14 illustrated in FIG. 2, which is preferably selected to be significantly shorter than the stop period of the relative position illustrated in FIG. 3. In a further variant, a rotational adjustment without stepping movement can also be performed, with, however, the movement speed able to be significantly greater when the washing opening 15 is open than when the washing opening 15 is closed.

According to FIG. 4, in another embodiment, the closed time of the washing opening 15 can be implemented as longer than its open time if the extension of the sealing surfaces 27 in the movement direction 24 is larger than the interval between the sealing surfaces 27 of neighboring links 26 in the movement direction 24. If the filter body 2 performs a continuous, uniformly rapid rotation in this case, closed times which are longer than the open times automatically occur. During the longer closed times, the washing pressure can then in turn be built up in the cleaning medium store and it can be filled with the necessary reserve of cleaning medium.

According to FIG. 5, in another embodiment, the intervals between neighboring sealing surfaces 27 relative to the movement direction 24 can be approximately as large as those in the extension direction of the sealing surfaces 27. In this embodiment, the closed time, during which the washing opening 15 is completely closed, is approximately as long as the open time or washing time, during which the washing opening 15 is completely opened, if the filter body 2 moves with a constant rotational speed. Nonetheless, the cleaning medium or washing volume flow can also be significantly larger in this case than the filling volume flow supplied through the cleaning medium source 23 into the cleaning medium store 18, because the filling of the cleaning medium store 18 can be performed permanently, i.e. uninterruptedly during both the closed time and the open time. In the present case, a washing volume can thus be achieved which is approximately twice as large as the filling volume flow.

What is claimed is:

1. Back-washable filter for liquids containing impurities having the following features:

A: at least one filter body (2) is located in a filter housing (1), where it separates an incoming flow chamber (5) on the unfiltered side from a outgoing flow chamber (7) on the filtered side, B: at least one washing channel (14) is located in the outgoing flow chamber (7) and presses against the filter body (2), C: the washing channel (14) has at least one washing opening (15) which faces the filter body (2), D: the washing channel (14) communicates with a cleaning medium source (23), E: a cleaning medium can be pressurized in the washing channel (14), F: the filter body (2) and the washing channel (14) can be moved relative to one another in a movement direction (24), G: the filterbody (2) has links (26), on a side facing the washing channel (14), which are positioned at intervals from one another in the movement direction (24), H: each two neighboring links (26) form a separate back-washable segment (25) on the filter body (2), I: during washing of one of the segments (25), the two associated links (26) press tightly against the washing channel (14) before and after the washing opening (15) relative to the movement direction (24) and expose the washing opening (15), J: the extension of each sealing surface (27) is greater than the extension of the washing opening (15) relative to the movement direction (24), SO that each link (26) can tightly close the washing opening (15) with its sealing surface (27), K: each link (26) can tightly seal the washing opening (15) with its sealing surface (27), L: the cleaning medium source (23) generates a pressure increase in the cleaning medium in the washing channel (14) when the washing opening (15) is closed by the sealing surface (27) of one of the links (26) in such a way that, when the washing opening (15) is opened, a washing procedure acting like a blast or pulse occurs.

2. Filter according to claim 1, characterized in that the washing channel (14) communicates relatively unrestrictedly with the cleaning medium store (18).

3. Filter according to claim 1, characterized in that the volume of the cleaning medium store (18), the pressure, and the washing opening (15) are dimensioned in such away that, during washing of a segment (25), the cleaning medium volume flow during the entire washing procedure is always greater, when the washing opening (15) is completely opened, than the filling volume flow of the cleaning medium source (23).

4. Filter according to claim 2, characterized in that the cleaning medium store (18) is implemented in the washing channel (14).

5. Filter according to claim 1, characterized in that the cleaning medium is a gaseous fluid, with the pressure being generated by compression of the gaseous fluid while the cleaning medium store (18) is filled.

6. Filter according to claim 1, characterized in that the cleaning medium is a liquid fluid, with the pressure being generated by elastic compression of a spring element, e.g. a gas cushion, while the cleaning medium store (18) is filled.

7. Filter according to claim 1, characterized in that the extension of the sealing surface (27) of each link (26) in the movement direction is as large as or larger than the interval between the sealing surfaces (27) of neighboring links (26).

8. Filter according to claim 7, characterized in that the extension of the sealing surface (27) of each link (26) in the movement direction (24) is approximately four to seven times, particularly five times, larger than the interval between the sealing surfaces (27) of neighboring links (26).

9. Filter according to claim 3, characterized in that the cleaning medium volume flow during washing of one of the segments (25) is approximately four to seven times larger than the filling volume flow of the cleaning medium source.

10. Method for the operation of a filter according to claim 1, characterized in that the cleaning medium source (23) produces a pressure increase in the cleaning medium in the washing channel (14) when the washing opening is closed by the sealing surface (27) of one of the links (26) in such a way that, when the washing opening (15) is opened, a washing procedure acting like a blast or pulse occurs.

11. Method according to claim 10, characterized in that a closed time, during which the washing opening (15) is closed by the sealing surface (27) of one of the links (26), is as long as or longer than a washing time, during which the washing of one of the segments (25) occurs.

* * * * *